United States Patent [19]

Milliner et al.

[11] Patent Number: 4,867,298
[45] Date of Patent: Sep. 19, 1989

[54] CONVEYOR SYSTEM FOR PLANAR PANEL

[75] Inventors: Kenneth M. Milliner; Robert T. Lewis; Everett N. Finn; Byron L. Lowe, all of Macon, Ga.

[73] Assignee: Brown & Williamson Tobacco Corporation, Louisville, Ky.

[21] Appl. No.: 226,003

[22] Filed: Jul. 29, 1988

[51] Int. Cl.$^4$ ............................................. B65G 29/00
[52] U.S. Cl. ................................. 198/408; 198/612; 198/524
[58] Field of Search ............... 198/408, 612, 611, 836, 198/524, 607, 457

[56] References Cited

U.S. PATENT DOCUMENTS

| | | | |
|---|---|---|---|
| 2,233,850 | 3/1941 | Rapley | 198/408 |
| 3,180,481 | 4/1965 | Brause | 198/611 X |
| 3,272,309 | 9/1966 | Reading | 198/611 |
| 3,669,239 | 6/1972 | Martin | 198/611 X |
| 3,777,630 | 12/1973 | Roda | 493/30 |

FOREIGN PATENT DOCUMENTS

| | | | |
|---|---|---|---|
| 1111101 | 7/1961 | Fed. Rep. of Germany | 198/611 |
| 1585324 | 2/1981 | United Kingdom | 198/836 |

Primary Examiner—Robert J. Spar
Assistant Examiner—Cheryl L. Gastineau
Attorney, Agent, or Firm—Charles G. Lamb

[57] ABSTRACT

A conveyor system for conveying planar panels in single file. The conveyor system can be used for receiving panels from bulk storage to a workstation. The conveyor system includes a conveyor belt apparatus located to receive the panels at its upstream end from the bulk supply device. A panel turning device is located at the downstream discharge end of the conveyor device for receiving the panels from the conveying device and redirecting them into the inlet end of a chute. An accumulative device is located over the conveyor to maintain a steady supply of panels to the chute. A photo cell control at the chute controls the number of spacers stacked in end-to-end relationship in the chute.

3 Claims, 2 Drawing Sheets

4,867,298

CONVEYOR SYSTEM FOR PLANAR PANEL

BACKGROUND OF THE INVENTION

The present invention relates to conveyor systems and more particularly to conveyor systems for conveying planar panels.

Planar panels are used in the packaging industry as reinforcing members in a package and as insets or separators between adjacent items contained in a package.

It is a problem in a high speed manufacturing environment to transport panels to be used in packages in an orderly, controlled manner at a high rate of speed from bulk storage to a workstation in preparation to the installation of the panels in a package without interruption in the flow of panels. It is a further problem to temporarily stop the conveying of such panels when the downstream package installation operation is interrupted without causing a stack-up of panels on the conveyor, and then restart the conveying of such panels upon resumption of the package installation operation without starvation of the flow of panels after the restart.

An example of one such conveyor system is disclosed in U.S. Pat. No. 3,777,630 issued on Dec. 11, 1973 which teaches an endless belt conveyor with a panel hopper at the upstream end and another endless belt at the downstream discharge end of the belt conveyor moving at a right angle to the belt conveyor to engage the panels leaving the belt conveyor and turn them downwardly to fall by gravity into a vertical guide. The panels are pushed from the hopper by a moveable blade which pushes the panels onto the conveyor belt. A feed roller at the upstream end of the belt conveyor forms a nip between the feed roller and the tail pulley of the conveyor belt. The panels from the hopper pass through the nip and are further pushed onto the conveyor belt by the feed roller.

SUMMARY OF THE INVENTION

The present invention provides a conveyor system for conveying planar panels comprising a conveyor belt apparatus having a top belt flight upon which the planar panels rest and are conveyed, accumulator means located along the top belt flight in brushing contact with the planar panels on the top belt flight, a vertical panel receiving chute located proximate the downstream end of the conveyor belt apparatus, and panel turning means located between the downstream end of the conveyor belt apparatus and inlet end of the chute for receiving panels from the conveyor belt apparatus and redirecting them downwardly into the inlet end of the chute.

BRIEF DESCRIPTION OF THE DRAWINGS

A better understanding of the invention will be had upon reference to the accompanying drawings wherein like numerals refer to like parts throughout the several views and in which.

DETAILED DESCRIPTION OF THE PREFERRED EMBODIMENT

Figure 1:
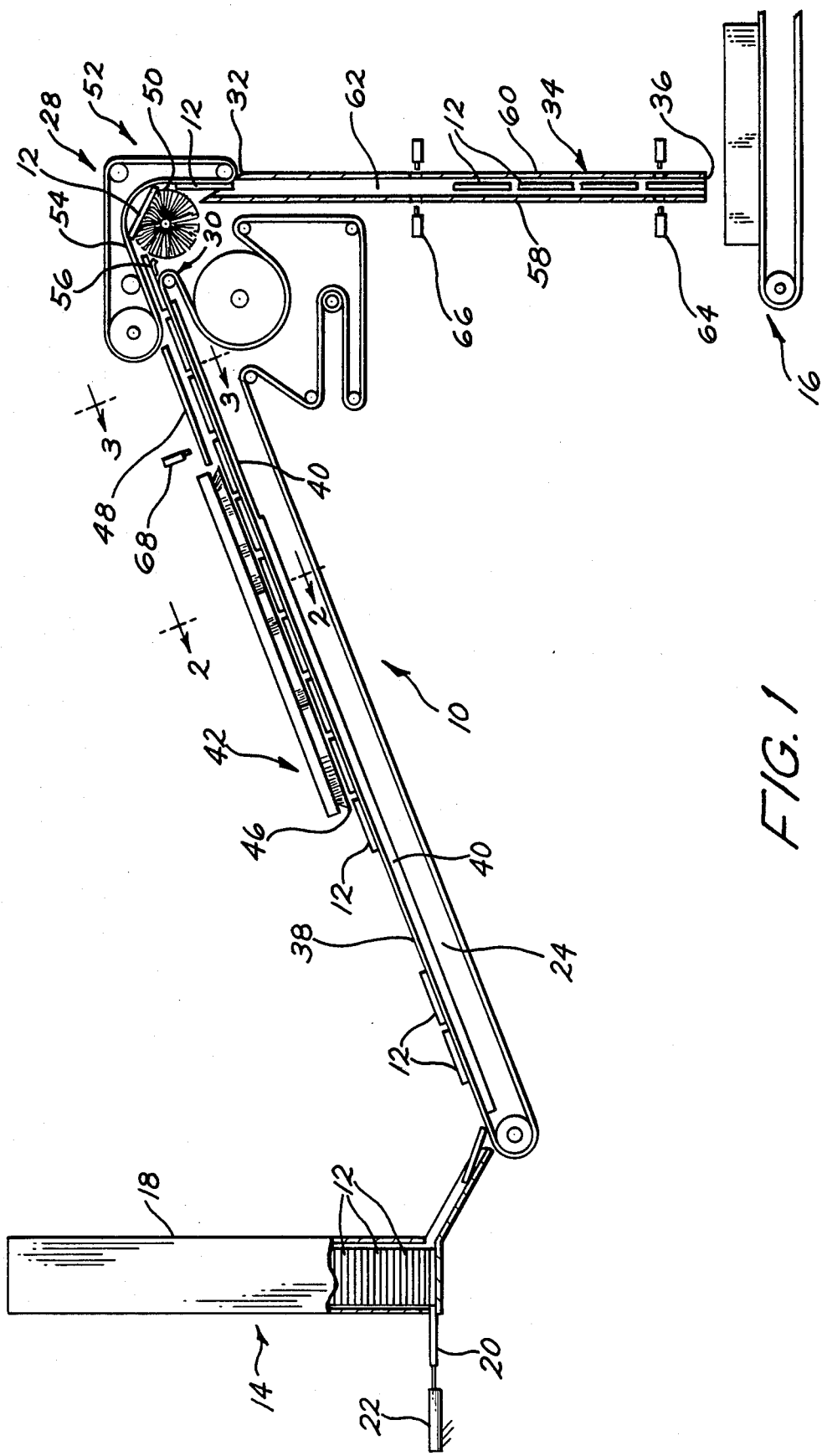
FIG. 1 is a schematic side view representation of a conveyor system for conveying planar panels of the present invention.

With reference to FIG. 1, there is shown a conveyor system, generally denoted as the numeral 10, for conveying planar panels 12 from a bulk supply station 14 to a workstation 16.

As shown, by way of example, the supply station 14 includes a magazine 18 holding a plurality of stacked panels 12, and a pusher blade 20 which moves transversely back and forth across the bottom end of the magazine 18 to engage and push the lower-most panel 12 from the magazine 18 and onto the conveyor system 10. The blade 20 can be moved back and forth by means of, for example, a hydraulic or pneumatic cylinder device 22. As the bulk supply station 14 does not form a part of this invention, it will not be described in further detail.

The workstation 16 can be, for example, a device for installing the panels 12 in a package, or as shown in FIG. 1, a take-away device such as a take-away conveyor 24 for moving the panels 12 away from the discharge end of the conveyor system 10. As the workstation 16 does not form a part of the invention, it will not be described in further detail.

With continued reference to FIG. 1, the conveyor system 10 comprises a conveyor belt apparatus 24 to receive the panels 12 at its upstream end 26 from the bulk supply station 14, and a panel turning device 28 located at the downstream end 30 of the conveyor belt apparatus 24 for receiving the panels 14 from the conveyor belt apparatus 24 and redirecting them downwardly into the inlet end 32 of a vertical chute 34. The outlet end 36 of the chute 34 discharges the panels 12 at the workstation 16.

Figure 2:
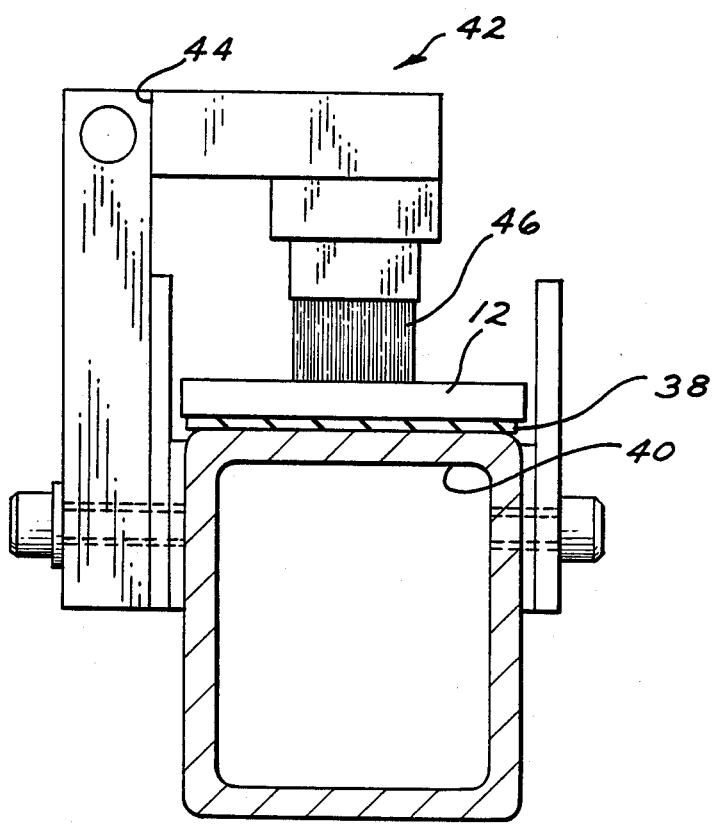
FIG. 2 is a transverse cross-sectional view as seen in the direction of arrows 2—2 in FIG. 1; and, FIG. 3 is a transverse cross-sectional view as seen in the direction of arrows 3—3 in FIG. 1.

With reference to FIGS. 1 and 2, the top flight 38 of the conveyor belt apparatus 24 rides on a rail 40 which stabilizes and smoothes out the movement of the top conveyor belt flight 38.

With continued reference to FIGS. 1 and 2, an accumulator device 42 is located over the conveyor belt top flight 38. The accumulator device 42 extends along the conveyor belt top flight 38 for a distance less than the length of the top flight 38 and terminates a distance short of the downstream end 30 of the conveyor belt apparatus 24. The accumulator device 42 comprises a bracket 44 over the conveyor belt top flight 38 and a brush 46 attached to the bracket 44 with the brush bristles depending toward the conveyor belt top flight 38 to a sufficient distance so that the bristles just contact the panels 12 being conveyed on the conveyor belt top flight 38 as they pass therebeneath.

Figure 3:
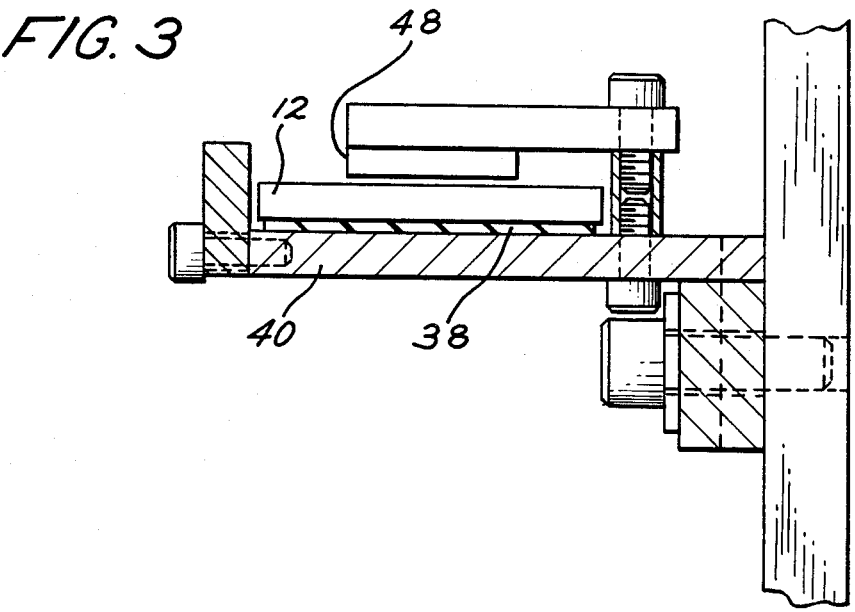

With reference to FIGS. 1 and 3, a stationary panel hold down plate 48 is located over the conveyor belt top flight 38 between the terminal end of the accumulator device 42 and downstream end 30 of the conveyor belt apparatus 24. The hold down plate 48 extends from the terminal end of the accumulator device 42 and ends a distance from the downstream end 30 of the conveyor belt apparatus 24. The panel hold down plate 48 is spaced above the conveyor belt top flight 38 by a distance sufficient to just clear the panels 12 being conveyed on the belt top flight 38 as they pass therebeneath.

With reference to FIG. 1, the panel turning device 28 comprises a brush wheel 50 located between the downstream end 30 of the conveyor belt apparatus 24 and inlet end 32 of the vertical chute 34. The top conveyor belt flight 38 and chute 34 are each generally tangential to the brush wheel 50. An endless belt apparatus 52 has a bottom belt flight which extends over the portion of the top conveyor belt flight 38 beyond the panel hold down plate 48, past the downstream end 30 of the conveyor belt apparatus 24, curves around a portion of the perimeter of the brush wheel 50, and downwardly a distance to the inlet end 32 portion of the vertical chute 34.

With continued reference to FIG. 1, the chute 34 includes two, parallel, spaced apart guides 58 and 60 defining a slot 62 therebetween. At the inlet end 32 of the chute 34, the guide 58 extends to the perimeter of the brush wheel 50 and is in spaced apart, parallel relationship to the bottom belt flight 54 of the endless belt apparatus 28.

As the top flight 38 of the conveyor belt apparatus 24 moves panels 12 to its downstream end 30, the bottom belt flight 54 of the endless belt apparatus 52 engages the panels 12 and moves them from the conveyor apparatus top flight 38. The panels 12 are then captured between the brush wheel 50 and bottom belt flight 54 of the endless belt apparatus 52 which causes the brush wheel 50 to turn in timed relationship with the moving bottom belt flight 54. The bristles of the brush wheel 50 are resiliently crushed by the panels 12 so that the panels 12 are not bent as they move in an arc with the bottom belt flight 54 and brush wheel 50.

The operation of the conveyor belt apparatus 24 and endless belt apparatus 52 of the panel forming device 28 are controlled by means of photoelectric cell devices located at the chute 34 and at the conveyor belt apparatus 24. As shown in FIG. 1, a first photoelectric cell device 64 is located proximate the bottom or outlet end 36 of the chute 34, a second photoelectric cell device 66 is located a predetermined distance above the first photoelectric cell device 64 along the length of the chute 34 toward the inlet end 32 into the chute 34, and a third photoelectric cell device 68 located over the conveyor belt top flight 38 at the terminal end of the accumulator device 42.

In operation, when the first photoelectric cell device 64 senses that there are no panels 12 in the chute 34, it shuts off or deactivates the workstation 16. When the second photoelectric cell device 66 senses that panels 12 are in the chute 34 up to the level of the second photoelectric cell device 66, the second photoelectric cell device 66 shuts off or deactivates the endless belt apparatus 52 of the panel turning device 28 so that no more panels 12 are pulled from the conveyor belt apparatus 24 and moved to the chute 34 until the supply of panels 12 in the chute 34 is used and the level of panels 12 drops below the position of the second photocell device 66. Under the operating condition just mentioned wherein the endless belt apparatus 52 is deactivated, the conveyor belt apparatus 24 will continue to operate moving panels 12 from the bulk supply station 14 to panel turning device 28 at the downstream end 30 of the conveyor belt apparatus 24 for a period of time after the endless belt apparatus 52 is deactivated. The accumulator device 42 allows the conveyor belt apparatus 24 to continue to move while holding the panels 12 stationary on the conveyor belt top flight 38 without having the panels stack up on each other and keeps them in a straight line in the still moving conveyor belt top flight 38. When the supply of panels 12 accumulates on the top belt flight 38 they will block off the third photoelectric cell device 68 which in turn shuts off or deactivates the conveyor belt apparatus 24 after a predetermined length of time. When the level of panels 12 in the chute 34 drop below the position of the second photoelectric cell device 66, the second cell device reactivates both the endless belt apparatus 52 of the panel turning device 28 and the conveyor belt apparatus 24. Thus, a reservoir of panels 12 is built up on the conveyor belt apparatus 24 so that when operation is resumed as the level of the panels 12 in chute 34 drops below the position of the second photoelectric cell device 66 the operation will not be starved for panels 12 thereby eliminating any delay in the supply of panels 12 to the turning device 28 and chute 34.

The foregoing detailed description is given primarily for clearness of understanding and no unnecessary limitations are to be understood therefrom.

What is claimed is:

1. A conveyor system for conveying planar panels comprising:
   a conveyor belt apparatus having a top flight upon which the planar panels rest and are conveyed;
   accumulator means located along the top belt flight in brushing contact with the planar panels on the top belt flight; a vertical panel receiving chute located proximate the downstream end of the conveyor belt apparatus; and,
   panel turning means located between the downstream end of the conveyor belt apparatus and inlet end of the chute for receiving panels from the conveyor belt apparatus and redirecting them downwardly into the inlet end of the chute comprising:
   a brush wheel located between the downstream end of the conveyor belt apparatus and the inlet end of the vertical chute; and,
   an endless belt apparatus having one flight which extends over a portion of the top conveyor belt flight at the downstream end of the conveyor belt apparatus, curves around a portion of the perimeter of the brush wheel, and extends downwardly a distance to the inlet end of the vertical chute.

2. The conveyor system of claim 1, further comprising:
   control means at the vertical chute and operatively associated with the conveyor belt apparatus and endless belt apparatus of the panel turning means for deactivating first the endless belt apparatus and then a period of time later deactivating the conveyor belt apparatus when the level of panels in the chute is at a first preselected position, and for reactivating the conveyor belt apparatus and endless belt apparatus of the turning means when the level of panels drops below a second preselected position.

3. The conveyor system of claim 1, wherein the accumulator means comprises a brush disposed over the top belt flight with the bristles depending toward the top belt flight a sufficient distance to make contact with the panels on the top belt flight.

* * * * *